US011250651B2

(12) United States Patent
Ewert

(10) Patent No.: US 11,250,651 B2
(45) Date of Patent: Feb. 15, 2022

(54) DATA RECORDER SYSTEM FOR A VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 16/354,808

(22) Filed: Mar. 15, 2019

(65) Prior Publication Data

US 2019/0311554 A1 Oct. 10, 2019

(30) Foreign Application Priority Data

Apr. 6, 2018 (DE) .......................... 102018205203.4

(51) Int. Cl.
  *G07C 5/08* (2006.01)
  *G07C 5/00* (2006.01)
  *B60R 21/0136* (2006.01)
  *B60R 21/00* (2006.01)

(52) U.S. Cl.
  CPC .......... *G07C 5/085* (2013.01); *B60R 21/0136* (2013.01); *G07C 5/008* (2013.01); *B60R 2021/0027* (2013.01)

(58) Field of Classification Search
  CPC .................................................... G07C 5/085
  See application file for complete search history.

(56) References Cited

U.S. PATENT DOCUMENTS

| | | | | |
|---|---|---|---|---|
| 2016/0275790 A1* | 9/2016 | Kang | .................. | G07C 5/0866 |
| 2017/0197632 A1* | 7/2017 | Rieth | ................. | B60W 50/082 |
| 2020/0098200 A1* | 3/2020 | Pohlenz | ................. | G07C 5/008 |

FOREIGN PATENT DOCUMENTS

| | | |
|---|---|---|
| DE | 19939468 A1 | 2/2001 |
| DE | 102006008139 B4 * | 5/2017 |

OTHER PUBLICATIONS

DE102006008139B4 machine translation, May 2017, Randler Martin.*

* cited by examiner

*Primary Examiner* — Anne Marie Antonucci
*Assistant Examiner* — Abdalla A Khaled
(74) *Attorney, Agent, or Firm* — Norton Rose Fulbright US LLP; Gerard Messina

(57) ABSTRACT

A data recorder system for a vehicle, including an evaluation and control unit and a memory device. The evaluation and control unit continuously evaluating internal, accident-relevant driving data, and external, accident-relevant driving data, which are received and provided by a communication device from other road users and/or infrastructure objects, which are situated within a predefined detection area in the surroundings of the associated vehicle, ascertaining distance information between the associated vehicle and the other road users and/or the infrastructure objects from the internal and external, accident-relevant driving data, buffering the internal and external, accident-relevant driving data and the pieces of distance information in a buffer memory of the memory device, and, after an accident is recognized, transmitting and securing the accident-relevant driving data and distance information stored in the buffer memory, which are suitable for reconstructing the course of events leading to the accident, in a permanent memory.

13 Claims, 3 Drawing Sheets

DATA RECORDER SYSTEM FOR A VEHICLE

CROSS REFERENCE

The present application claims the benefit under 35 U.S.C. § 119 of German Patent Application No. DE 102018205203.4 filed on Apr. 6, 2018, which is expressly incorporated herein by reference in its entirety.

FIELD

The present invention is directed to a data recorder system for a vehicle. The subject matter of the present invention are also a method for recording accident-relevant driving data and a corresponding device for a vehicle for carrying out the method for recording accident-relevant driving data.

BACKGROUND INFORMATION

Autonomous vehicles that include a device for providing at least one safety function and/or at least one vehicle function, in particular, at least one autonomous driving function, which assumes at least partially an actual driving task, are available in the related art. Such a vehicle drives at least partially autonomously in this case by independently recognizing, for example, the road course, other road users or obstacles and by calculating the corresponding control instructions in the vehicle and forwarding these to the actuators in the vehicle, as a result of which the driving route of the vehicle is correctly influenced. The driver is not involved in the driving process in the case of a fully autonomous vehicle. Vehicles available at present are not yet able to operate fully autonomously, since the corresponding technology is not yet fully developed and it is still prescribed by law that the driver of the vehicle him/herself must be able to intervene in the driving process at any time. This complicates the implementation of fully autonomous vehicles. However, there are already systems of various manufacturers that enable an autonomous or semi-autonomous driving.

Saving vehicle-relevant data for a legally predefined period of time in vehicles that drive at least partially autonomously is now already being considered. Data are stored in a so-called black box, for example, as to when a vehicle has been operated manually and when it has been operated autonomously. These data are stored in the black box in an automated manner. However, some data may not be permanently stored in a black box for reasons of data protection. Other data, in turn, may be stored in a black box only in certain events.

A data recorder is in part already present in modern vehicles. The data recorder has the task, in the case of an accident, for example, of recording data for reconstructing the course of events leading to the accident. Accident-relevant data such as, for example, acceleration values, are normally continuously stored in a ring memory. In order in the case of an accident to also be able to evaluate data before the actual accident event, the oldest data in the ring memory are always replaced by the newest data. If an accident occurs, the entire contents of the ring memory are stored in a remanent memory and may be read out if needed.

A method for controlling a recording of an accident data recorder in motor vehicles and an accident recorder are described in German Patent Application No. DE 199 39 468 A1. In this method, the vehicle surroundings are detected in the driving direction of the motor vehicle using a video sensor and are provided as a video signal in the accident data recorder. In the method, it is provided that the video signal is analyzed and assessed in the accident data recorder according to a predefinable scheme, and the assessment signal is incorporated in a predefinable characteristic map, which is used to establish a time period of the recording of the accident data record. It is further provided that the accident data recorder is made up of at least one signal processing unit that includes a data processor for analyzing a provided video signal, and at least one signal memory component that includes a memory medium for storing an analysis program and for saving data. The accident data recorder may also include an interface to a vehicle-internal data network, so that the detection of data, such as the vehicle velocity, acceleration or the like is possible via the interface. Since a power supply is frequently no longer possible via the vehicle power supply system following an accident, a power supply separate from the vehicle power supply system may be assigned to the accident data recorder.

SUMMARY

An example data recorder system for a vehicle, as well as an example method for recording accident-relevant driving data, and the device for a vehicle for carrying out the method for recording accident-relevant driving data, in accordance with the present invention, may each have the advantage that a three-dimensional evaluation of the course of events leading to the accident with a depiction of the host vehicle and of the surrounding road users over time is possible.

Specific embodiments of the present invention provide a data recorder system for a vehicle, including an evaluation and control unit and a memory device. The evaluation and control unit continuously evaluates internal, accident-relevant driving data, which are detected and provided by at least one sensor unit of the associated vehicle, and external, accident-relevant driving data, which are cyclically received and provided by a communication device from other road users and/or infrastructure objects, which are situated within a predefined detection area in the surroundings of the associated vehicle. The evaluation and control unit ascertains pieces of distance information between the associated vehicle and the other road users and/or the infrastructure objects from the internal and external, accident-relevant driving data. In addition, the evaluation and control unit stores the internal, accident-relevant driving data and the external, accident-relevant driving data and the pieces of distance information in a buffer memory of the memory device. After an accident is recognized, the evaluation and control unit transmits and secures the accident-relevant driving data and pieces of distance information stored in the buffer memory, which are suitable for reconstructing the course of events leading to the accident, in a permanent memory of the memory device.

In addition, specific embodiments of the present invention provide a method for recording accident-relevant driving data. In this method, internal, accident-relevant driving data from at least one sensor unit of the associated vehicle and external, accident-relevant driving data, which are provided by other road users and/or infrastructure objects within a predefined detection area in the surroundings of the associated vehicle, are detected and evaluated. On the basis of the internal, accident-relevant driving data and the external, accident-relevant driving data, pieces of distance information between the associated vehicle, the other road users and/or the infrastructure objects are ascertained. The accident-relevant driving data and the pieces of distance information are continuously buffered and are suitable for reconstructing the course of events leading to an accident, the buffered data being permanently stored after an accident is recognized.

In addition, a device for a vehicle is provided for carrying out the method for recording accident-relevant driving data. The accident-relevant driving data and pieces of distance information are provided for at least one safety function and/or for at least one vehicle function, in particular, for an automated driving function, which assumes at least partially an actual driving task.

Specific embodiments of the present invention may store data permanently if certain criteria are met. Thus, in the case of an accident, for example, identification information and accident-relevant driving data may be permanently stored, which originate from vehicles that are less than a maximum distance of, for example, 100 meters from a vehicle involved in an accident. In this case, the internal, accident-relevant driving data of the associated vehicle and the external, accident-relevant driving data of the other vehicles within the predefined detection area may be buffered during the driving operation. If one of the other vehicles leaves the predefined detection area, the buffered data of this vehicle are deleted again. The data of the other vehicles may also be deleted again if the associated vehicle is parked and no incident or accident has occurred. No pieces of information are to be stored regarding the location of the neighboring vehicle when it is precisely the location where no incident has occurred. If a particular incident occurs, for example, an accident, the accident-relevant driving data of the associated vehicle, as well as of the neighboring vehicles within the detection area, detected and buffered already before the accident, are permanently written from the buffer memory into the non-volatile permanent memory of the memory unit of the associated vehicle.

The buffer memory may be designed, for example, as a ring memory, since some data may not be permanently stored for reasons of data privacy protection, or other data may be stored only in certain events. This ring memory may, for example, temporarily store data for a predefined period of time of, for example, 10 seconds and for a predefined number of vehicles. New data are inserted into the ring memory, whereas old data are deleted from the ring memory. The period of time should be selected in such a way that an accident reconstruction is possible. Once the internal, accident-relevant data of the host vehicle and the external, accident-relevant data of the other vehicles within the detection area are stored, the data of the permanent memory may be read out and evaluated by certified bodies or authorities.

The evaluation and control unit may be understood in the present case to mean an electrical device such as, for example, a control unit, which processes and evaluates detected data. The evaluation and control unit may include at least one interface, which may be designed in hardware and/or in software. When designed in hardware, the interfaces may, for example, be part of a so-called system ASIC, which contains a wide variety of functions of the evaluation and control unit. It is also possible, however, that the interfaces are dedicated, integrated circuits or are made up at least partially of discrete components. When designed in software, the interfaces may be software modules, which are present in a microcontroller in addition to other software modules. Also advantageous is a computer program product having program code, which may be stored on a machine-readable medium, such as a semiconductor memory, a hard disk memory or an optical memory, and which is used for carrying out the evaluation when the program is executed by the evaluation and control unit.

A sensor unit is understood in the present case to mean an assembly, which includes at least one sensor element that directly or indirectly detects a physical variable or a change of a physical variable and preferably converts it into an electrical sensor signal. This may take place, for example, by emitting and/or receiving sound waves and/or electromagnetic waves and/or via a magnetic field or the change of a magnetic field and/or by receiving satellite signals, for example, of a GPS signal. The sensor unit may, for example, encompass pressure-sensitive sensor elements, which ascertain an impact area on the vehicle, and/or acceleration sensor elements, which detect acceleration-relevant pieces of information of the vehicle, and/or sensor elements, which ascertain and provide for evaluation objects and/or obstacles and/or other crash-relevant vehicle surroundings data. Such sensor elements may be based, for example, on video and/or radar and/or LIDAR and/or PMD and/or ultrasonic technologies. In addition, signals and pieces of information of an existing ABS sensor system and the variables derived in the control unit provided for such purpose may also be evaluated. A vehicle movement and a vehicle position may be estimated in three-dimensional space on the basis of the acceleration-relevant pieces of information and/or on the variables derived therefrom, the instantaneously estimated vehicle position in space capable of being evaluated for rollover recognition and being assessed as the normal driving condition or as a rollover.

A communication between vehicles (car-to-car communication) is understood below to mean the exchange of pieces of information and data between vehicles. The aim of this data exchange is to report advance critical and dangerous situations to the driver. The affected vehicles collect data, such as ABS interventions, steering angle, position, direction, velocity, etc. and send these data via radio (WLAN, UMTS . . . ) to the other road users or vehicles. In the process, the "visual range" of the driver is intended to be extended using electronic means.

A communication between vehicles and an infrastructure object (car-to-infrastructure) is understood to mean the exchange of data between a vehicle and the surrounding infrastructure such as, for example, light signal systems. The cited technologies are based on the interaction of sensors of the various road users and use the newest methods of communication technology for exchanging these pieces of information.

Global navigation satellite systems GNSS (GNSS; Global Navigation Satellite System) may, for example, be used for determining the position of the vehicles. In this case, GNSS is used as a collective term for the use of existing and future global satellite systems such as NAVSTAR GPS (Global positioning system) of the United States of America, GLONASS (Global Navigation Satellite System) of the Russian Federation, Galileo of the European Union, Beidou of the Peoples Republic of China, etc.

Position sensors, which calculate a highly accurate vehicle position with the aid of navigation satellite data (GPS, GLONASS, Beidou, Galileo), are used for automated vehicle functions, which assume at least partially an actual driving task. Moreover, correction data of so-called correction services may also be used in the position sensor in order to calculate even more precisely the position of the vehicle. A highly accurate reference time (for example, universal time), together with the received GNSS data, is also read into the position sensor and used for the exact position determination.

Advantageous improvements on the data recorder system for a vehicle in accordance with the present invention, on the method for recording accident-relevant driving data in accordance with the present invention, and on the device for a vehicle for carrying out the method for recording accident-relevant driving data in accordance with the present invention, are described herein.

It is particularly advantageous if the internal and/or external, accident-relevant driving data may encompass vehicle surroundings data of a surroundings sensor system and/or vehicle status data of a vehicle sensor system of the individual vehicles and/or position data of the individual vehicles and/or of the infrastructure objects. The pieces of distance information may encompass, for example, relative distances and/or relative velocities between vehicles and relative distances of the vehicles to the infrastructure objects. The pieces of distance information may, for example, be calculated from the vehicle surroundings data, which are detected, for example, via camera units, radar units, LIDAR units and/or ultrasonic sensor units or may alternatively be ascertained directly from the transit time of the communication signals between the associated vehicle and the other vehicles and/or the infrastructure objects.

In one advantageous embodiment of the data recorder system, the detection area may be predefined via a maximum distance to the associated vehicle. The maximum distance in this case may be predefined as a function of an instantaneous velocity of the associated vehicle and/or of a traffic density and/or of a quality of the communication with the other road users and/or infrastructure objects. Thus, in the case of an accident, for example, identification information and accident-relevant driving data may be permanently stored, which originate from vehicles that are less than a maximum distance of, for example, 100 meters to the vehicle involved in the accident.

In another advantageous embodiment of the data recorder system, the memory device may be implemented in the associated vehicle and/or in a cloud.

In one advantageous embodiment of the method, the external accident-relevant driving data may be cyclically received from the other road users and or from the infrastructure objects and be buffered for a predefinable period of time; the oldest buffered data may be overwritten by the newest data.

In another advantageous embodiment of the method, permanently stored data may be used for a three-dimensional reconstruction of the course of events leading to the accident with a depiction of the associated vehicle and of the other road users and/or of the infrastructure objects within the detection area.

The accident-relevant driving data and the pieces of distance information may be stored in a memory device in the vehicle and/or transmitted to and stored in a cloud.

The vehicles within the predefined detection area may be advantageously combined in the cloud to form a group of vehicles. In this way, the vehicle-related, accident-relevant driving data and pieces of distance information may be buffered in the cloud for each of the vehicles of the virtual group of vehicles. After an accident, the vehicle-related, accident-relevant driving data and pieces of distance information of the affected vehicles of the virtual group of vehicles may be permanently stored in the cloud. Once the vehicle-related, accident-relevant driving data of the affected vehicle and of the other vehicles of the virtual group of vehicles are permanently stored, the permanently stored data of the virtual group of vehicles may be read out and evaluated by certified bodies or authorities. The data of the surrounding vehicles as well as of the affected vehicle may be evaluated using an additional device, positioned downstream from the readout unit, in such a way that a three-dimensional evaluation of the course of events leading to the accident result with a depiction of the affected vehicle and of the surrounding vehicles over time.

In another advantageous embodiment of the device for carrying out the method for recording accident-relevant driving data, the at least one driving function may use the accident-relevant driving data and the pieces of distance information in the planning of a trajectory for the vehicle. In this way, accidents in the associated vehicle may be avoided and evasive maneuvers may be precisely planned.

Exemplary embodiments of the present invention are shown in the figures and are explained in greater detail below. Identical reference numerals in the drawing refer to components or elements that carry out the same or similar functions.

DETAILED DESCRIPTION OF EXAMPLE EMBODIMENTS

Figure 1:
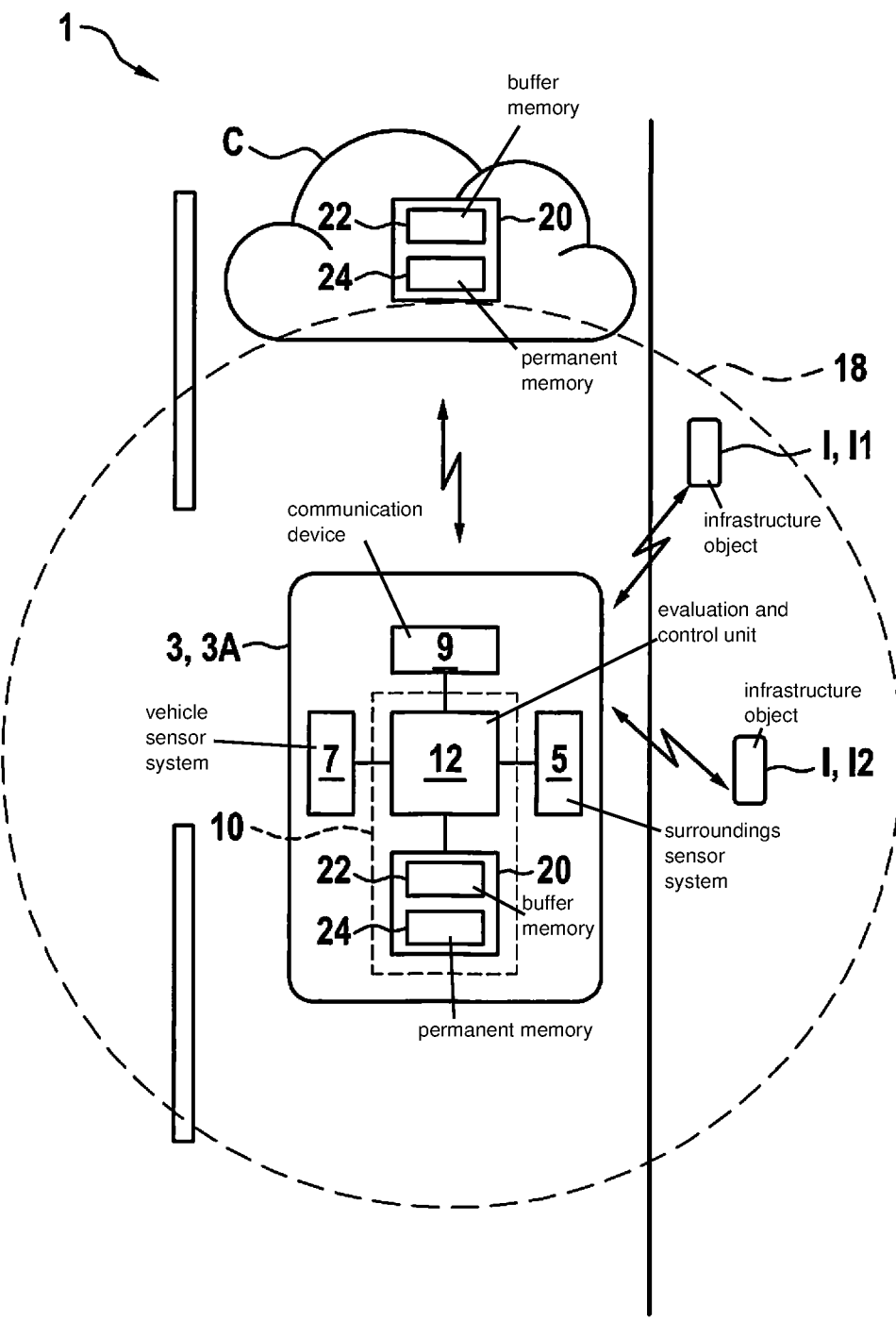
FIG. 1 schematically shows a depiction of a road detail that includes a vehicle, which includes an exemplary embodiment of a data recorder system according to the present invention for a vehicle, and an exemplary embodiment of a device for a vehicle for carrying out a method for recording accident-relevant driving data.
Figure 2:
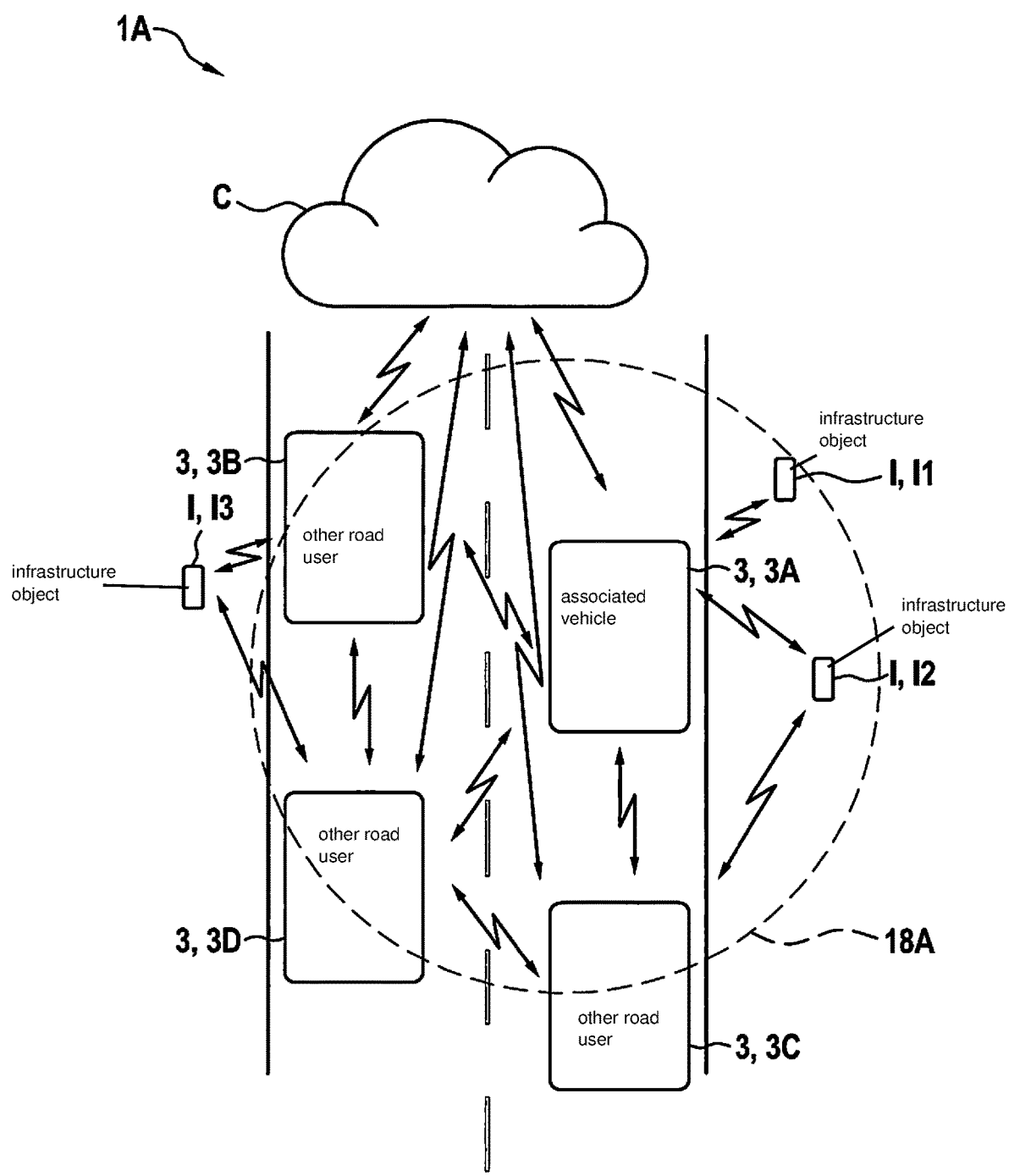
FIG. 2 schematically shows a depiction of a road section that includes multiple vehicles, each of which includes the data recorder system according to the present invention for a vehicle, and the device for a vehicle for carrying out the method for recording accident-relevant driving data.

As is shown in FIGS. 1 and 2, depicted vehicles 3, 3A, 3B, 3C each include a data recorder system 10 having an evaluation and control unit 12 and a memory device 20. Evaluation and control unit 12 continuously evaluates internal, accident-relevant driving data, which are detected and provided by at least one sensor unit of associated vehicle 3A, and external, accident-relevant driving data, which are received and provided by a communication device 9 from other road users 3B, 3C, 3D and/or from infrastructure objects I, I1, I2, I3. In this case, the other road users 3B, 3C, 3D are situated within a predefined detection area 18, 18A in the surroundings of associated vehicle 3A. Evaluation and control unit 12 ascertains pieces of distance information between associated vehicle 3A, other road users 3B, 3C, 3D and/or infrastructure objects I, I1, I2, I3 from the internal and external accident-relevant driving data, evaluation and control unit 12 buffering the internal, accident-relevant driving data and the external, accident-relevant driving data and the pieces of distance information in a buffer memory 22 of memory device 20. After an accident is recognized, evaluation and control unit 12 transmits and secures the accident-relevant driving data and pieces of distance information stored in buffer memory 22, which are suitable for reconstructing the course of events leading to the accident, in a permanent memory 24 of memory device 20.

The internal and/or external accident-relevant driving data encompass vehicle surroundings data and/or vehicle status data of individual vehicles 3 and/or position data of individual vehicles 3 and/or of infrastructure objects I, I1, I2, I3.

As is further apparent from FIGS. 1 and 2, vehicles 3 in the depicted exemplary embodiment each include a surroundings sensor system 5, which detects vehicle surroundings data and provides them to evaluation and control unit 12 via a suitable interface. Vehicles 3 in the depicted exemplary embodiment each also include a vehicle sensor system 7, which detects vehicle status data and/or position data and provides them to evaluation and control unit 12 via a suitable interface. Infrastructure objects I, I1, I2, I3 are light signal systems, for example, having a predefined geographical position. Infrastructure objects I, I1, I2, I3 transmit, for example, their geographical position and their instantaneous signal status as accident-relevant driving data to vehicles 3 in predefined detection area 18, 18A.

As is further apparent from FIG. 1, vehicles 3 in the depicted exemplary embodiment each include a communication device 9, which receives the external, accident-relevant driving data of other vehicles 3 and provides them to evaluation and control unit 12. As is further apparent from FIG. 2, vehicle 3A, for example, receives external, accident-relevant driving data from vehicles 3B, 3C, 3D as other road users and from infrastructure objects I I1, I2, I3 via communication device 9.

In the depicted exemplary embodiment, the calculated pieces of distance information encompass relative distances and relative velocities of vehicles 3 among one another and relative distances of vehicles 3 to infrastructure objects I I1, I2, I3. In an alternative exemplary embodiment, not depicted, the relative velocities of vehicles 3 among one another are not calculated, but only the relative distances.

As is further shown in FIGS. 1 and 2, detection area 18, 18A in the exemplary embodiment depicted is circular and predefined over a maximum distance to associated vehicle 3A. The detection area may, of course, have a different shape. As is further apparent from FIG. 2, associated vehicle 3A receives external, accident-relevant driving data from other vehicles 3B, 3C, 3D and from infrastructure objects I1 and I2. Associated vehicle 3A receives no accident-relevant driving data from another infrastructure object I3, since this infrastructure object is outside detection area 18A. The maximum distance is predefined as a function of an instantaneous velocity of the associated vehicle and/or of a traffic density and/or of a quality of the communication with other road users 3B, 3C, 3D and/or with infrastructure objects I, I1, I2. Thus, in the case of an accident, for example, identification information and accident-relevant driving data may be permanently stored, which originate from vehicles 3B, 3C, 3D, which are less than a maximum distance of, for example, 100 meters to vehicle 3A involved in the accident. Thus, different detection areas 18, 18A may be predefined, for example, inside and outside of cities.

As is further shown FIG. 1, memory device 20 in the depicted exemplary embodiment is implemented in associated vehicle 3A and in a cloud C. In alternative exemplary embodiments not depicted, memory device 20 may be implemented only in vehicles 3 and not in cloud C. In addition, it is conceivable to implement buffer memory 22 of memory device 20 in the vehicle and permanent memory 24 of memory device 20 in cloud C. In the exemplary embodiment depicted, buffer memory 22 is designed as a ring memory, which buffers data for a predefined period of time of, for example, 10 seconds. New data are inserted into the ring memory, whereas old data are deleted from the ring memory.

Figure 3:
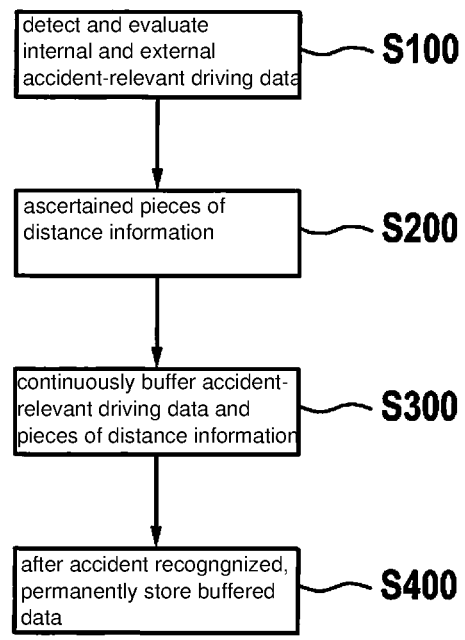
FIG. 3 shows a flow chart of one exemplary embodiment of a method according to the present invention for recording accident-relevant driving data.

As is further shown in FIG. 3, internal, accident-relevant driving data from at least one sensor unit of associated vehicle 3A and external, accident-relevant driving data, which are provided by other road users 3B, 3C, 3D and/or by infrastructure objects I, I1, I2, I3 within a predefined detection area 18, 18A in the surroundings of associate vehicle 3A, are detected and evaluated in the depicted exemplary embodiment in a step S100 of method 100 for recording accident-relevant driving data. Pieces of distance information between associated vehicle 3A, other road users 3B, 3C, 3D and/or infrastructure objects I, I1, I2, I3 are ascertained in a step S200 on the basis of the internal, accident-relevant driving data and on the external, accident-relevant driving data. In a step S300, the accident-relevant driving data and the pieces of distance information, which are suitable for reconstructing the course of events leading to the accident, are continuously buffered. After an accident is recognized, the buffered data are permanently stored in a step S400.

As previously stated above, the external, accident-relevant driving data cyclically received from other road users 3B, 3C, 3D and/or from infrastructure objects I I1, I2, I3, are buffered only for a predefinable period of time.

In the exemplary embodiment depicted, the permanently stored data are used for a three-dimensional reconstruction of the events leading to the accident with a depiction of associated vehicle 3A and of other road users 3B, 3C, 3D and/or of infrastructure objects I, I1, I2, I3 within detection area 18, 18A.

In an exemplary embodiment of method 100 not depicted, vehicles 3A, 3B, 3C, 3D within the predefined detection area 18, 18A may be combined in cloud C to form a group of vehicles. In this case, the vehicle-related, accident-relevant driving data and pieces of distance information for each of vehicles 3 of the virtual group of vehicles are buffered in cloud C. After an accident, the vehicle-related, accident-relevant driving data and pieces of distance information of affected vehicles 3A, 3B, 3C, 3D of the virtual group of vehicles are permanently stored in cloud C. Once the vehicle-related, accident-relevant driving data and pieces of distance information of affected vehicle 3A and of other vehicles 3B, 3C, 3C are stored, the data of permanent memory 24 of memory device 20 may be read out and evaluated by certified bodies or authorities. The data of other vehicles 3B, 3C, 3D, as well as of affected vehicle 3A, are evaluated using an additional device, positioned downstream from the readout unit, in such a way that a three-dimensional evaluation of the course of events leading to the accident result with a depiction of affected vehicle 3A and other vehicles 3B, 3C, 3D over time.

This method may be implemented, for example, in software or in hardware or in a hybrid form of software and hardware in a device or control unit. The device or control unit uses the accident-relevant driving data and pieces of distance information in at least one safety function and/or in at least one vehicle function, in particular, in an automated driving function, which assumes at least partially an actual driving task. Such a driving function uses the accident-relevant driving data and the pieces of distance information in planning a trajectory for vehicle 3A.

What is claimed is:

1. A data recorder system for a vehicle, comprising:
   an evaluation and control unit, consisting of a processor; and
   a memory device having a buffer memory;
   wherein the processor and the memory device are configured to perform the following:
   (i) continuously evaluating internal, accident-relevant driving data, which are detected and provided by at least one sensor unit of the vehicle, (ii) receiving external, accident-relevant driving data, from a communication device from other road users and/or from infrastructure objects, which are situated within a predefined detection area in surroundings of the vehicle, (iii) ascertaining pieces of distance information between the vehicle and the other road users and/or the infrastructure objects from the internal accident-relevant driving data and the received external, accident-relevant driving data, (iv) buffering, for a predefinable period of time, the internal, accident-relevant driving data and the received external, accident-relevant driving data and the pieces of distance information in the buffer memory, and (v) transmitting and securing, after an accident is recognized, the internal, accident-relevant driving data, external, accident-relevant driving data, and the pieces of distance information buffered in the buffer memory, which are suitable for providing a three-dimensional reconstruction of a course of events leading to the accident, in a permanent memory of the memory device;

wherein the three-dimensional reconstruction, which is obtained from the permanently stored data, represents the events leading to the accident, and include a depiction of the vehicle and of other road users, including other vehicles, and the infrastructure objects within a detection area, wherein the buffer memory includes a ring memory, wherein the detection area is predefined over a maximum distance, and wherein the predefined maximum distance is a function of: an instantaneous velocity of the associated vehicle and a traffic density, and (i) a quality of a communication with the other road users, and (ii) a quality of a communication with the infrastructure objects.

2. The data recorder system as recited in claim 1, wherein the internal and/or external, accident-relevant driving data encompass vehicle surroundings data of a surroundings sensor system and/or vehicle status data of a vehicle sensor system of individual vehicles and/or position data of the individual vehicles and/or of the infrastructure objects.

3. The data recorder system as recited in claim 1, wherein the pieces of distance information encompass relative distances and/or relative velocities of vehicles among one another and relative distances of the vehicles to the infrastructure objects.

4. The data recorder system as recited in claim 1, wherein the memory device is in the vehicle and/or in a cloud.

5. A method for recording accident-relevant driving data, the method comprising:

detecting and evaluating internal, accident-relevant driving data from at least one sensor unit of an associated vehicle and external, accident-relevant driving data, which are provided by other road users and/or by infrastructure objects within a predefined detection area in surroundings of the associated vehicle;

ascertaining pieces of distance information between the associated vehicle, the other road users and/or the infrastructure objects, based on the internal, accident-relevant driving data and the external, accident-relevant driving data;

continuously buffering, via a buffer memory of a memory device, for a predefinable period of time, the internal, accident relevant driving data, the external, accident relevant driving data and the pieces of distance information;

wherein the buffered internal, accident relevant driving data, the buffered external, accident relevant driving data, and the buffered pieces of distance information are suitable for providing a three-dimensional reconstruction of a course of events leading to an accident, and the buffered internal, accident relevant driving data, the buffered external, accident relevant driving data, and the buffered pieces of distance information is permanently stored after the accident is recognized, wherein the three-dimensional reconstruction, which is obtained from the permanently stored data, represents the events leading to the accident, and include a depiction of the vehicle and of other road users, including other vehicles, and the infrastructure objects within a detection area, wherein the buffer memory includes a ring memory, wherein the detection area is predefined over a maximum distance, and wherein the predefined maximum distance is a function of: an instantaneous velocity of the associated vehicle and a traffic density, and (i) a quality of a communication with the other road users, and (ii) a quality of a communication with the infrastructure objects.

6. The method as recited in claim 5, wherein the external, accident-relevant driving data are cyclically received from the other road users and/or from the infrastructure objects and are buffered for a predefinable period of time, oldest buffered data being overwritten by newest data.

7. The method as recited in claim 5, wherein the internal, accident-relevant driving data and/or external, accident-relevant driving data encompass vehicle surroundings data of a surroundings sensor system, and/or vehicle status data of a vehicle sensor system of individual vehicles, and/or position data of the individual vehicles, and/or position of the infrastructure objects.

8. The method as recited in claim 5, wherein the internal, accident-relevant driving data, the external, accident-relevant driving data, and the pieces of distance information, are stored in a memory device in the vehicle.

9. The method as recited in claim 5, wherein the internal, accident-relevant driving data, the external, accident-relevant driving data, and the pieces of distance information are transmitted to and stored in a cloud.

10. The method as recited in claim 9, wherein vehicles within the predefined detection area are combined to form a virtual group of vehicles.

11. The method as recited in claim 10, wherein vehicle-related, accident-relevant driving data and pieces of distance information for each of the vehicles of the virtual group of vehicles are buffered in the cloud, the vehicle-related, accident-relevant driving data and pieces of distance information of an affected vehicle of the virtual group of vehicles being stored permanently in the cloud after an accident.

12. A device for a vehicle for recording accident-relevant driving data, comprising:

an evaluation and control unit, consisting of a processor; and a memory device having a buffer memory;

wherein the processor is configured to perform the following:

detecting and evaluating internal, accident-relevant driving data from at least one sensor unit of an associated vehicle and external, accident-relevant driving data, which are provided by other road users and/or by infrastructure objects within a predefined detection area in surroundings of the associated vehicle;

ascertaining pieces of distance information between the associated vehicle, the other road users and/or the infrastructure objects, based on the internal, accident-relevant driving data and the external, accident-relevant driving data;

continuously buffering, via a buffer memory of a memory device, for a predefinable period of time, the internal, accident relevant driving data, the external, accident relevant driving data and the pieces of distance information;

wherein the buffered internal, accident relevant driving data, the buffered external, accident relevant driving data, and the buffered pieces of distance information are suitable for providing a three-dimensional reconstruction of a course of events leading to an accident, and the buffered internal, accident relevant driving data, the buffered external, accident relevant driving data, and the buffered pieces of distance information are permanently stored after the accident is recognized, and wherein the internal, accident relevant driving data, the external, accident relevant driving data, and the pieces of distance information are provided for at least one safety function and/or for at least one vehicle function, wherein the at least one vehicle function includes an automated driving function which assumes at least partially an actual driving task, and wherein the three-dimensional reconstruction, which is obtained from the permanently stored data, represents the events leading to the accident, and include a depiction of the vehicle and of other road users, including other vehicles, and the infrastructure objects within a detection area, wherein the buffer memory includes a ring memory, wherein the detection area is predefined over a maximum distance, and wherein the predefined maximum distance is a function of: an instantaneous velocity of the associated vehicle and a traffic density, and (iii) a quality of a communication with the other road users, and (iv) a quality of a communication with the infrastructure objects.

13. The device as recited in claim 12, wherein the at least one driving function uses the internal, accident relevant driving data, the external, accident relevant driving data, and the pieces of distance information in planning a trajectory for the vehicle.

* * * * *